Aug. 20, 1968　　　F. M. ADLER　　　3,397,503
METHOD FOR CONSTRUCTING PRESSURE VESSELS
Filed Dec. 15, 1965　　　　　　　　　　12 Sheets-Sheet 1
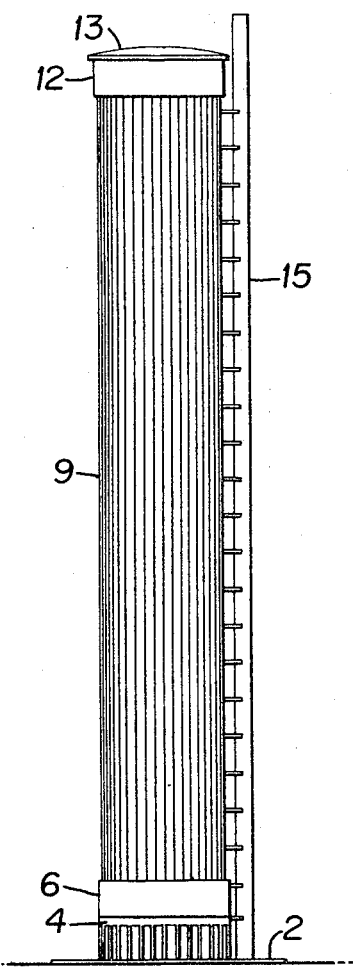
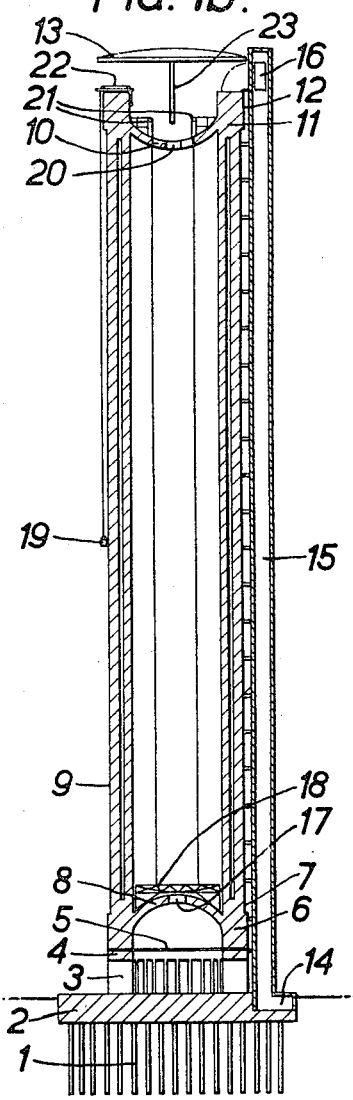
INVENTOR.
FELIX MAX ADLER
BY Morgan, Finnegan, Durham & Pine
ATTORNEYS.

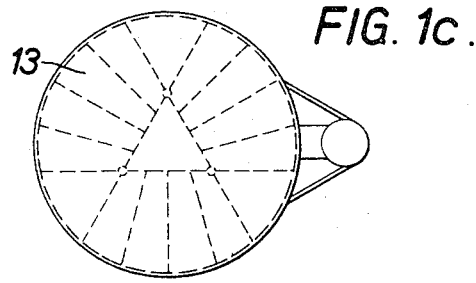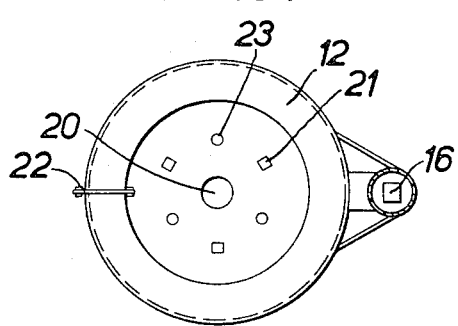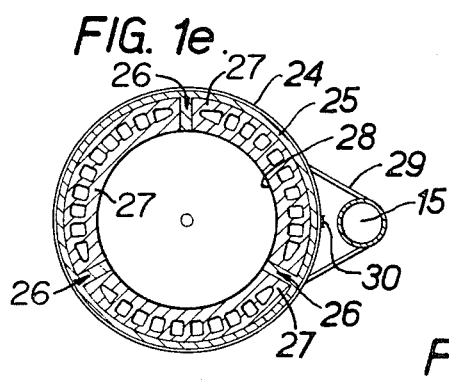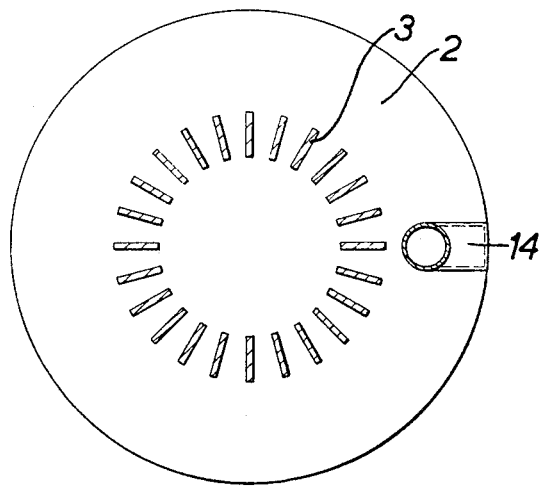

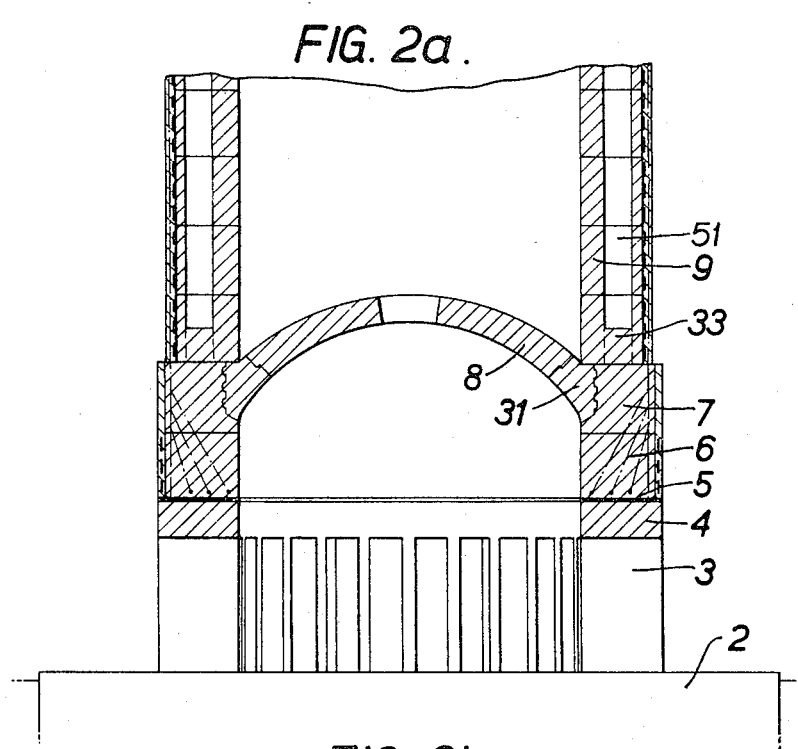
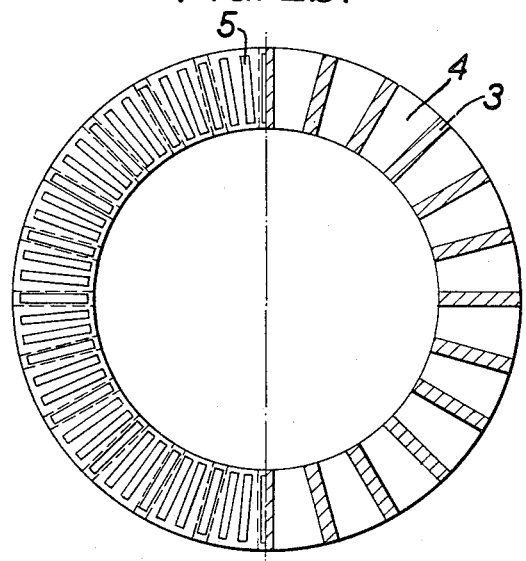

INVENTOR.
FELIX MAX ADLER

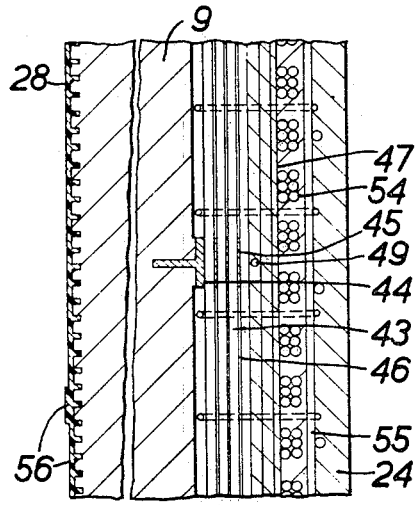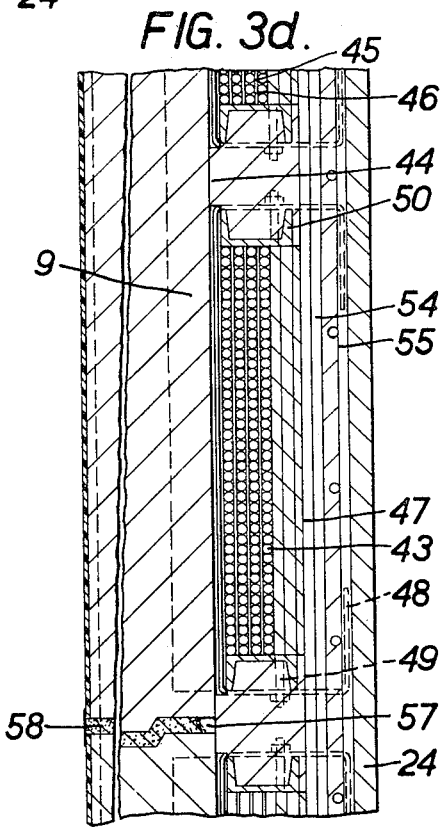

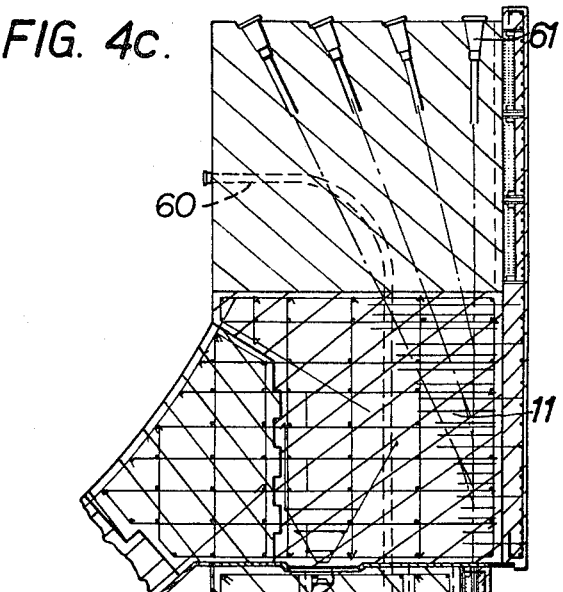
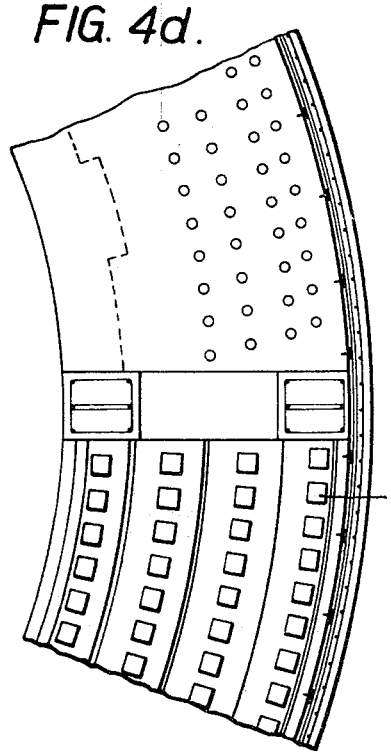

Aug. 20, 1968          F. M. ADLER          3,397,503
METHOD FOR CONSTRUCTING PRESSURE VESSELS
Filed Dec. 15, 1965                    12 Sheets-Sheet 9

INVENTOR.
FELIX MAX ADLER

BY
Morgan, Finnegan, Durham & Pine
ATTORNEYS.

INVENTOR.
FELIX MAX ADLER

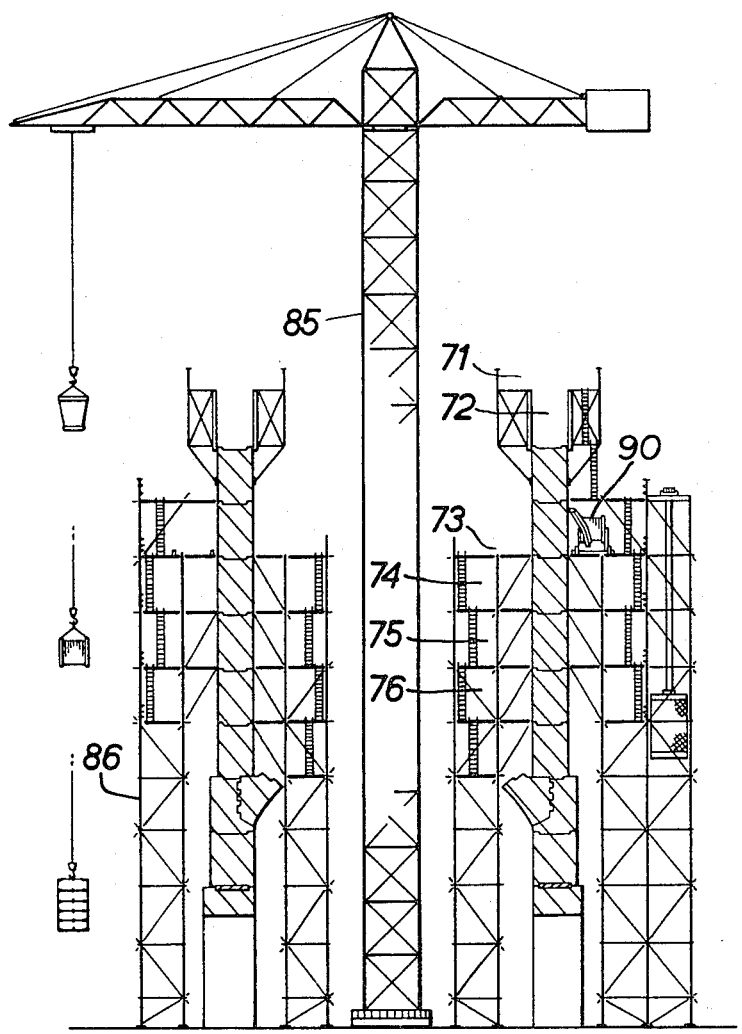

United States Patent Office 3,397,503
Patented Aug. 20, 1968

3,397,503
METHOD FOR CONSTRUCTING
PRESSURE VESSELS
Felix Max Adler, "Woodlands," Birds Hill Road,
Oxshott, England
Filed Dec. 15, 1965, Ser. No. 523,822
Claims priority, application Great Britain, Dec. 17, 1964,
51,439/64, Patent 51,439
5 Claims. (Cl. 52—745)

ABSTRACT OF THE DISCLOSURE

A pressure-resistant vessel is made of a stack of pre-stressed annular members each consisting of two or more segments. The pre-stressing of each annular member is effected by winding a cable tautly around the annular member and forcing the segments apart by means of jacks disposed between the ends of adjacent segments, so as to tension the cable. The jacks are then replaced by an infill which maintains the cable in the tensioned state. The stack of annular members is capped at each end and cables extending longitudinally from end to end of the capped stack are tensioned and held in the tensioned state, thereby forming a monolithic structure.

---

The invention relates to a cylindrical shell and to a method for its construction, the cylindrical shell being particularly adapted for use as part of a pressure vessel.

More particularly, the invention relates to a method of constructing a cylindrical shell of pre-stressed concrete suitable for forming part of a vessel for containing for example a fluid under high pressure or for housing a nuclear reactor. The cylindrical shell is preferably provided with dome-like or dished ends. The invention also encompasses an apparatus or jig for carrying out the method of the invention, the jig including climbing shutter assemblies or formwork for the concrete.

According to the invention, there is provided a method of making a pre-stressed annular member which includes two or more segments, comprising the steps of winding a cable around the periphery of the annular member, forcing the segments apart to tension the cable and securing the segments with the cables in the tensioned position.

The cylindrical shell preferably rests on a plurality of resilient bearing pads. Each annular member forming the pressure shell is pre-stressed by forcing apart its segments by means of jacks disposed in the gaps between the segments of the shell. The jacks are expanded so that they force the segments of the pressure shell against the steel cable winding and the steel cable winding is itself thereby stretched. The pre-stressing jacks are gradually replaced by reinforced concrete infills while the cable segments are held in the stressed condition.

The diameter of the shell is thus increased by such stressing operation and to facilitate such movement of the segments of the shell, each section of the shell (that is, each annular member with its cable winding) is temporarily separated from the adjoining sections above and below by means of vertical jacks temporarily inserted into pockets in the sections. The vertical jacks are adapted to be movable relatively to the sections and the vertical jacks are expanded simultaneously with the hoop or pre-stressing jacks which force the segments apart. Each section is lowered on to green mortar upon completion of hoop stressing and the vertical jacks are removed from the pockets and the pockets are made good with concrete infill.

Upon completion of the topmost annular section of the cylindrical vessel, vertical or axial pre-stress is applied by means of stressing cables disposed vertically and externally of the shell, to compress the entire structure of superposed segmental annular sections or rings into a monolithic whole.

A gas-proof lining of, for example, polyvinyl chloride, is disposed on the internal wall of the vessel and the vessel is subjected to test pressure during which an external skin of reinforced concrete is formed, the test pressure being maintained until the external skin is completed. Upon release of the pressure, the vessel contracts and the external skin is thereby subjected to compression or pre-stress along with the rest of the vessel.

In a preferred construction according to the invention, the wall of the shell is provided with a series of vertically or axially extending cells or cavities.

The annular sections or rings forming the shell are preferably formed of three segments, and the vertical cells or cavities in each segment are preferably disposed along an arc different from that of the segment. Advantageously the intermediate cells or cavities of the row of cells in a segment are disposed nearer the external surface of the segment than are the cells adjacent the ends of the row. Suitably, each end of the row of cells in each segment starts, at the corresponding end of the segment, at approximately a mid-position between the external and internal surfaces of the segment.

The cavities in the superposed sections or rings are in alignment to form a series of vertical cavities extending from the top to the bottom of the wall or shell of the vessel.

It will be understood that the cavities or cells are not present in the dome supporting shells or the shells housing the vertical stressing cable gathering and the stressing anchorages provided at both ends of the vessel.

The invention further comprises the features of construction shown in the accompanying drawings in which:

FIGURE 1a is a side elevation of one construction of pressure vessel according to the invention;

FIGURE 1b is a sectional side elevation of the pressure vessel illustrated in FIGURE 1a;

FIGURE 1c is a plan view of the roof of the pressure vessel illustrated in FIGURE 1a;

FIGURE 1d is a sectional plan view through the machinery housing of the pressure vessel illustrated in FIGURE 1a;

FIGURE 1e is a typical sectional plan view through the pressure vessel illustrated in FIGURE 1a;

FIGURE 1f is a plan view of the foundations of the pressure vessel;

FIGURE 2a is a sectional side elevation through the bottom of the pressure vessel illustrated in FIGURE 1a;

FIGURE 2b is a plan view of a bearing ring for a pressure vessel according to the invention;

FIGURE 3a is a typical horizontal sectional elevation through the pressure vessel illustrated in FIGURE 1a;

FIGURE 3b is a vertical section through the pressure vessel shown in FIGURE 3a;

FIGURE 3c is an enlarged vertical section through the pressure vessel which for ease of draughting has been straightened out so that it does not show the curvature of the pressure vessel;

FIGURE 3a is an enlarged vertical section through the pressure vessel;

FIGURE 4a is a vertical section through the top of the pressure vessel illustrated in FIGURE 1a;

FIGURE 4b is a plan view of the pressure vessel illustrated in FIGURE 4a;

FIGURE 4c is an enlarged vertical section of the pressure vessel illustrated in FIGURE 4a;

FIGURE 4d is a view similar to FIGURE 4b but on an enlarged scale;

FIGURE 6b is a plan view of the jig shown in FIGURE 6a;

FIGURE 7 is a sectional elevation through a further kind of jig for use in constructing vessels according to the invention.

Figure 2C:
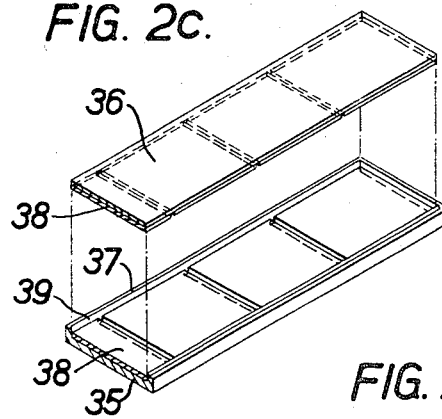
FIGURE 2c is a perspective elevation of the bearing pad unit illustrated in FIGURE 2b.
Figure 2D:
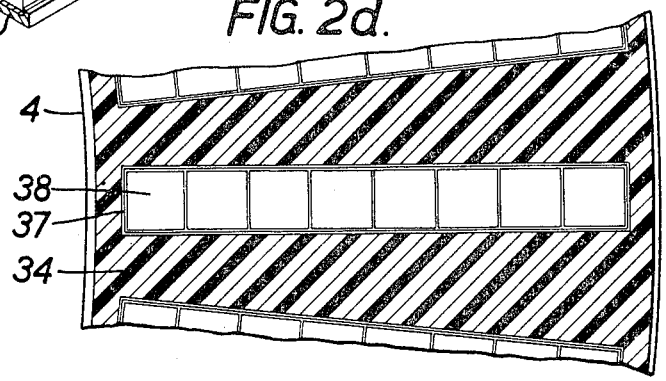
FIGURE 2d is a plan view of part of a bearing pad unit.
Figure 2E:
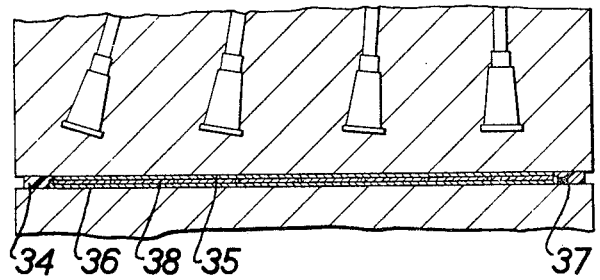
FIGURE 2e is a longitudinal section through a bearing pad unit.
Figure 2F:
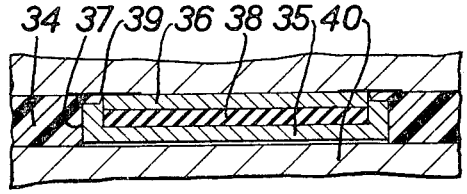
FIGURE 2f is a transverse section through the bearing pad unit illustrated in FIGURE 2e.

Referring to FIGURES 1a to 1f there is illustrated a pressure vessel which is supported on a reinforced concrete cap 2 which is itself supported by a series of precast concrete piles 1. Mounted on the cap 2 are a series of columns 3 of reinforced concrete which support a reinforced concrete ring beam 4. Positioned on the ring beam in radial spaced relation is a series of resilient bearings 5 which permits radial expansion of the pressure vessel relatively to its supporting structure. Mounted on the bearings 5 is a shell 6 which contains the anchorages for a plurality of vertical pre-stressing members, above which shell is mounted a further shell 7 in which the vertical members are gathered and which supports an end member or lower dome 8 which constitutes one end of the pressure vessel. Extending upwardly from the lower dome 8 is a pressure shell 9 which comprises a series of superposed annular sections or rings and which is capped at its upper end with an end member or upper dome 10. In similar manner to the bottom of the pressure vessel the upper dome is supported by a shell 11 in which the upper end of the vertical pre-stressing cables are gathered, a further shell 12 being positioned on the shell 11, which shell 12 contains the stressing end anchorages for the vertical pre-stressing members or cables.

The top of the pressure vessel is covered by a structural steel roof 13 which may be raised away from its rest position for maintenance purposes. In FIGURE 1a the roof is shown in the lowered position and in FIGURE 1b the roof is shown in the raised position. The roof is supported on telescopic column supports 23.

A maintenance lift shaft 15 is positioned adjacent the pressure vessel, a motor room and over-run pit 14 being provided at its lower end. A maintenance lift car 16 is provided with a "drawbridge" type door which spans the gap between the lift shaft and the pressure vessel. The vessel is also provided with an inner maintenance platform 18 which is movable by means of winches 21, and an outer maintenance cradle 19 which is supported on a gantry and winch arrangement 22. The interior of the pressure vessel may be reached through an upper access 20 in the dome 10 or through a lower access 17 in the dome 8.

Referring to FIGURE 1e, the pressure shell 9 of the pressure vessel comprises an outer skin 24 of reinforced concrete, a pressure "sock" 25 of pre-stressing steel cable and reinforced concrete segments 27 provided with a series of hollow vertical cells 51. The gap between each segment of each annular section of the pressure shell is filled with concrete packing and infill indicated generally by reference numeral 26. The interior of the vessel is covered with a membrane 28 in order to render it gas tight. The lift shaft 15 is secured to the vessel by means of brackets 29 which are fixed to the pressure vessel. Also secured to the exterior of the pressure vessel is a maintenance ladder 30.

Referring to FIGURE 2a there is shown a cross-section through the bottom of the pressure vessel. Between the ring beam 4 and the shell 6, which contains the anchorages for the vertical pre-stressing cables, is positioned a series of bearing pad units 5. Above the shell 6 is positioned the shell 7, in which the vertical pre-stressing cables are gathered and which serves to support the lower dome 8. For this purpose the shell 7 contains a recessed portion to which is secured an annular dome springing member 31. Preferably the recess is keyed so as to provide a good bond between the shell 7 and the springing member 31. Mounted on the springing member 31 is the reinforced concrete dome 8. Also mounted on the shell 7 is the pressure shell 9 which is provided with hollow vertical cells 51.

Referring to FIGURES 2b to 2f the bearing pad units 5 are positioned on the ring beam 4 in radial spaced relation. Each bearing pad unit comprises a bottom casing plate or tray 35 of mild steel and having a chequer pattern engraved or otherwise formed on its underside, a top casing plate or lid 36 also of mild steel and having a chequer pattern formed on its upper surface, side retaining plates 37 which are of mild steel and which are welded to the bottom casing plate, and a series of separate neoprene rubber pads 38, one series of which are bonded to the top casing plate 36, and a further series of which are bonded to the bottom casing plate 35. Sealing tape 39 is provided around the joint between the top and bottom part of each bearing pad unit in order to prevent the joints of the casing units from becoming clogged with cement mortar.

Each bearing pad unit is mounted on a bedding 40 of cement grout in order to prevent the unit from moving relatively to the ring beam 4, the chequer patterning in the bearing casing units helping to provide a good bond between the bearing units and the bedding. Each bearing pad unit is surrounded by an infilling 34 of expanded polystyrene or the like.

Figure 3B:
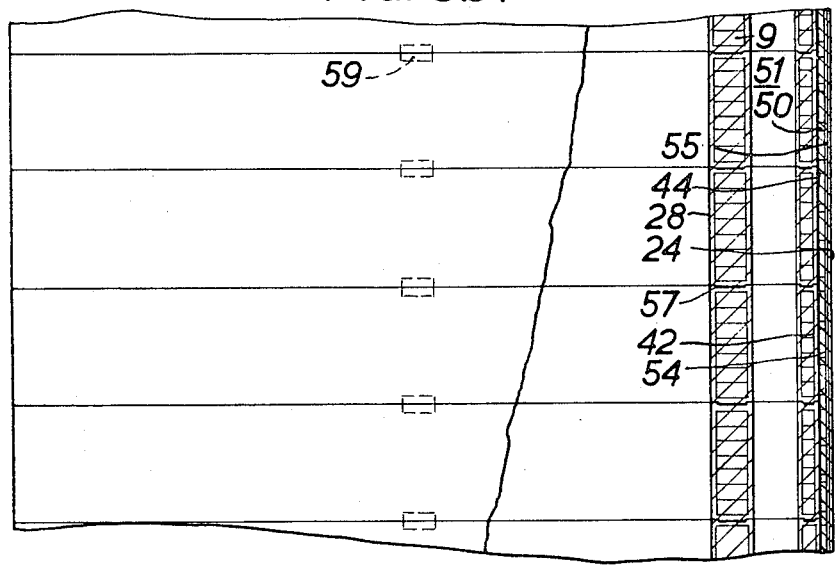
Figure 3A:
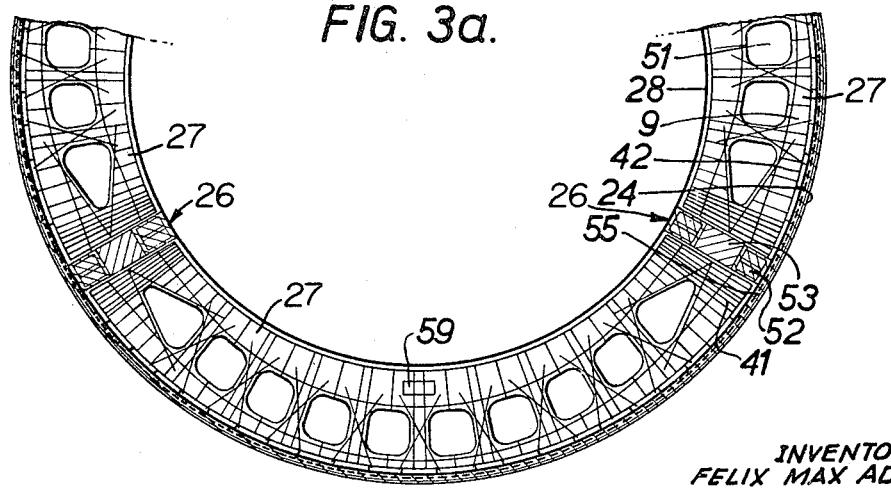

In FIGURES 3a and 3d there are shown horizontal and vertical sections through parts of the pressure shell. Each segment 27 of a section of the pressure shell is provided with mild steel reinforcement 42 and anchorage reinforcement 41 at the ends of each segment. Reference numeral 24 denotes the outer skin which is also of reinforced concrete. The shell is provided with a horizontal pre-stressing winding 43 which comprises a steel cable which is wound around the shell, before the outer skin 24 has been applied, against a series of mild steel deflectors 44 which are T-shaped in cross-section. As illustrated in FIGURE 3c a series of mild steel spacer strips 45 is positioned between each layer of the horizontal windings so as to prevent the friction between the layers of the winding from becoming excessive in which case it would be difficult or impossible to tension the cable. A grouting 46 is forced between each layer of the windings under pressure after the windings have been tensioned in the manner described below. In addition, the outer layer of the horizontal windings is covered by a layer of cement mortar which is sprayed under pressure onto wire netting or the like. The horizontal windings are contained between a pair of mild steel channel sections 50 which prevent the windings from moving out of place. The channel members 50 may be held together for example, by means of mild steel tie-rods 49. Tie-rods 48 are also provided by which the outer skin 24 of the pressure shell may be secured to the "pressure sock" of horizontal windings 43.

Each segment of the pressure shell, of which in the illustrated embodiment there are three to each section, includes a series of vertical extended cavities 51. These cavities are preferably positioned along an arc which is different from that of the segment itself, that is to say the cavities are not parallel with the inner and outer surfaces of the segment. It has been found in practice that this is beneficial as it reduces the effect of friction between the pre-stressing cables and the pressure shell, although why this should be the case is not fully understood.

The gap between each adjacent segment is filled with a reinforced load bearing concrete packing 52 and with a non-load bearing concrete infill 53 in the centre of the gap. The packing 52 and infill 53 form the composite packing and infill identified by the reference numeral 26 in FIGURE 1e. The vertical pre-stressing cables for the pressure shell are indicated at 54 and a mild steel reinforcement for the outer skin of the pressure vessel is indicated at 55.

The interior of the pressure vessel is covered with synthetic plastics sheeting 28 which forms a gas-proof lining, the joint between the adjacent sheets being provided by vertical joining strips 56 which are welded to the respective sheets. The synthetic plastics sheeting may for example be made of polyvinyl chloride.

As illustrated in FIGURE 3d, the gap between one annular section of the pressure shell and the section immediately above the said one section is filled with a green mortar bed 57, and is squeezed under load in order to provide a good joint between the adjacent sections. The plastic sheets 28 are provided with horizontal jointing 58 in the vicinity of the joints between the superposed sections, the joints being so constructed that if the pressure inside the pressure vessel exceeds a predetermined limit the joints open in the manner of a safety valve. Pockets 59 are provided in the segments, in which pockets jacks may be positioned in order to lift one section clear of the sections above and below when applying the horizontal pre-stressing to the section. After these jacks have been removed the pockets are filled-in with cement mortar or concrete.

Figure 4A:
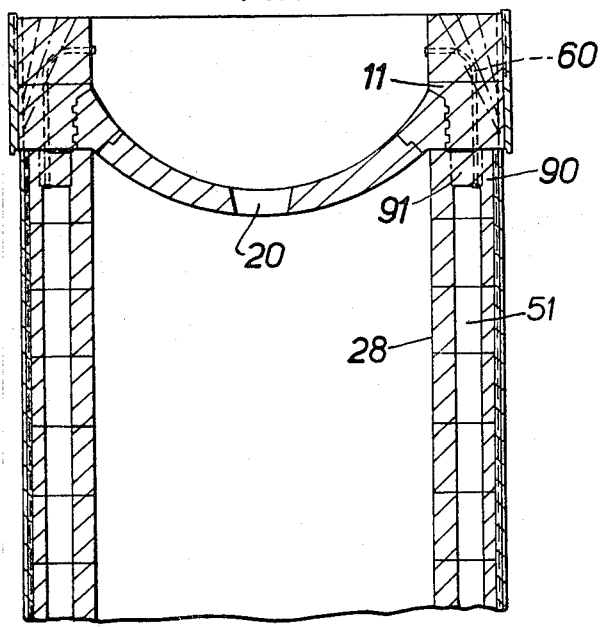
Figure 4B:
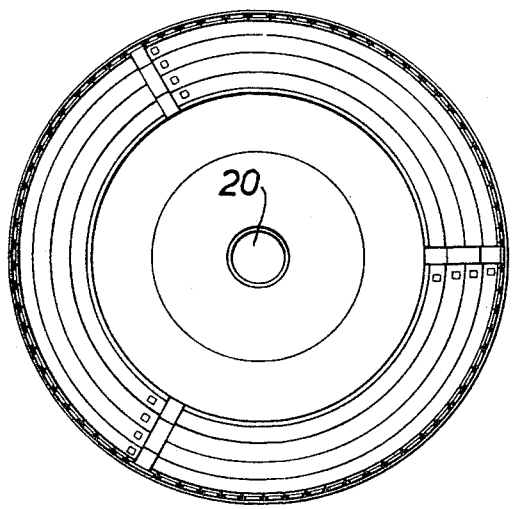

In FIGURE 4c, it will be noted that the lower face top end of the pressure vessel which is substantially identical to the bottom of the pressure vessel. A ventilation and gas detection pipe 60 is provided to extend between the cavities 51 in the pressure shell and atmosphere. Mounted in the shell 12 are a series of anchorages 61 for the vertical pre-stressing steel cables 54.

In FIGURE 4c, it will be noted that the lower face of the shell 11 is provided with a rib 62 which locates in a corresponding recess provided in the uppermost section 90 of the pressure shell. For this reason the cavities in the uppermost section 90 are filled-in with a load bearing material 91 for example concrete. The rib 62 and its associated recess acts as a hinge between the shell 11 and the pressure shell when the vertical reinforcing cables are tensioned. In similar manner the lower cable gathering shell 7 is also provided with a hinge.

Figure 5A:
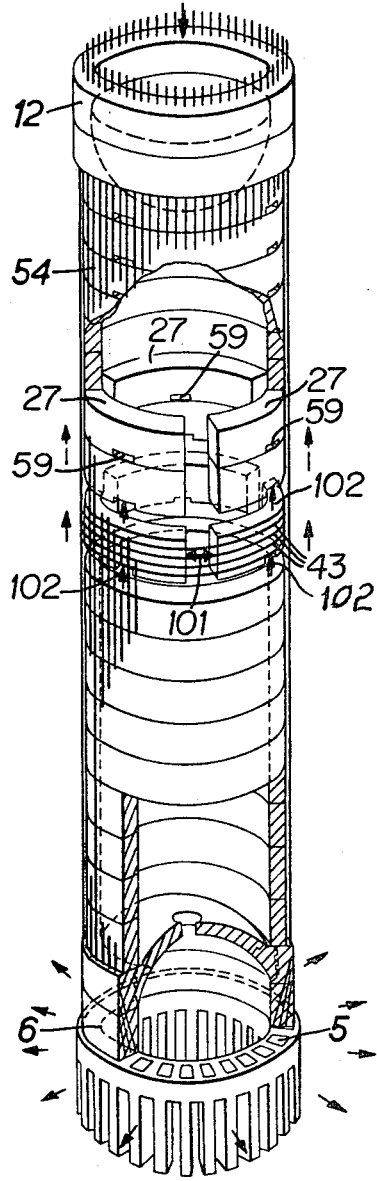
FIGURE 5a is a perspective view of the pressure vessel illustrated in FIGURE 1a and shown partially in section.
Figure 5B:
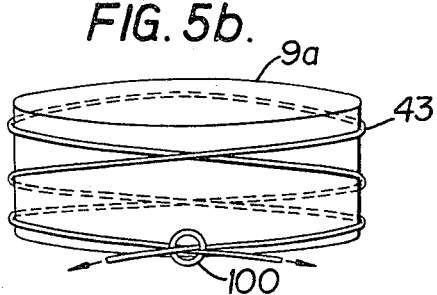
FIGURE 5b illustrates the method of applying horizontal reinforcement to the pressure vessel.
Figure 5C:
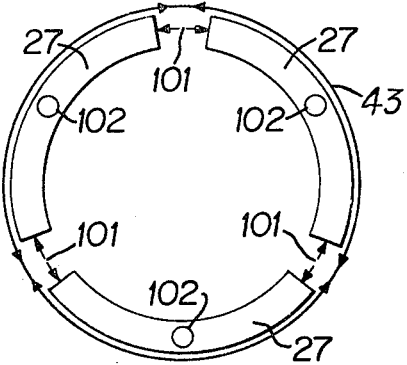
FIGURE 5c illustrates the method of tensioning the horizontal reinforcement.

FIGURES 5a and 5c diagrammatically illustrate the method by which the vertical and horizontal pre-stressing of the pressure vessel is achieved. FIGURE 5b diagrammatically shows the horizontal winding 43 of steel cable about an annular section or member 9a of the pressure shell, the ends of the winding 43 being tied off or coupled by a member 100 such as a standard cable grip. Each pressure shell section comprises three segments 27. The cells 51 of the segments are omitted in FIGURES 5a and 5c for simplicity of illustration. Jacks diagrammatically shown at 101 (FIGURES 5a and 5c) are placed between the ends of the adjacent segments after the horizontal windings 43 have been wound taut round the outside of the three segments 27 of a section and the ends of the pre-stressing cables have been anchored in members 100. Before the jacks 101 in the particular section are expanded, that section is temporarily separated from the sections immediately above and below it by means of vertical jacks diagrammatically shown at 102 (FIGURES 5a and 5c) disposed in the pockets 59 of the segments 27. The jacks 101 are then expanded to force the segments 27 apart against the pre-stressing cable 43 and while the segments are held in such position with the cable in the stressed condition, the pressure shell section is lowered onto a green mortar bed provided on the subjacent section and the vertical jacks 102 on which the section was lifted are removed. With the cable 43 still in the stressed condition, concrete is poured into the gaps between the ends of the adjacent segments to replace the jacks 101, thereby permanently securing the segments 27 in a position with the horizontal pre-stressing cable 43 under tension. This operation is repeated with each succeeding annular section of the pressure shell. When sufficient sections of the pressure vessel have been placed one on top of the other to make up the required height of the vessel, the upper dome is built on the uppermost of the sections. Vertical pre-stressing of the pressure vessel is then effected by means of vertical pre-stressing cables 54 which are anchored at the top and bottom ends of the pressure vessel in the shells 12 and 6 respectively. It will be understood to those of ordinary skill in the art that any one of several types of jacks presently commercially available and well known in the art may be suitably used as jacks 101, 102. Thus, either hydraulic, solid, ram or double acting jacks are suitable. Advantageously, the "Simplex" jacks manufactured by Templeton, Kenly and Co. may be used, particularly Models R300/6, operating at 8560 p.s.i. and R500/6, operating at 7400 p.s.i., available in the United States from William S. Pine, Inc., Los Angeles, Calif. As shown in FIGURE 5a the bearing pad units 5 allow the pressure vessel to expand and contract radially relatively to the ring beam 4.

In order to facilitate radial movement of one section relatively to another section during the application of the horizontal stress, the jacks 102 are preferably mounted on rollers, ball bearings or the like.

During the construction of the pressure vessel the internal face of the pressure vessel is made gas-proof by means of the membrane 28. The vessel is then inflated to its working pressure and while the vessel is expanded in this condition, the outer skin 24 of reinforced concrete is applied. If the outer skin were applied when the vessel was in an uninflated condition, then the skin would probably crack when the vessel was inflated.

Figure 6A:
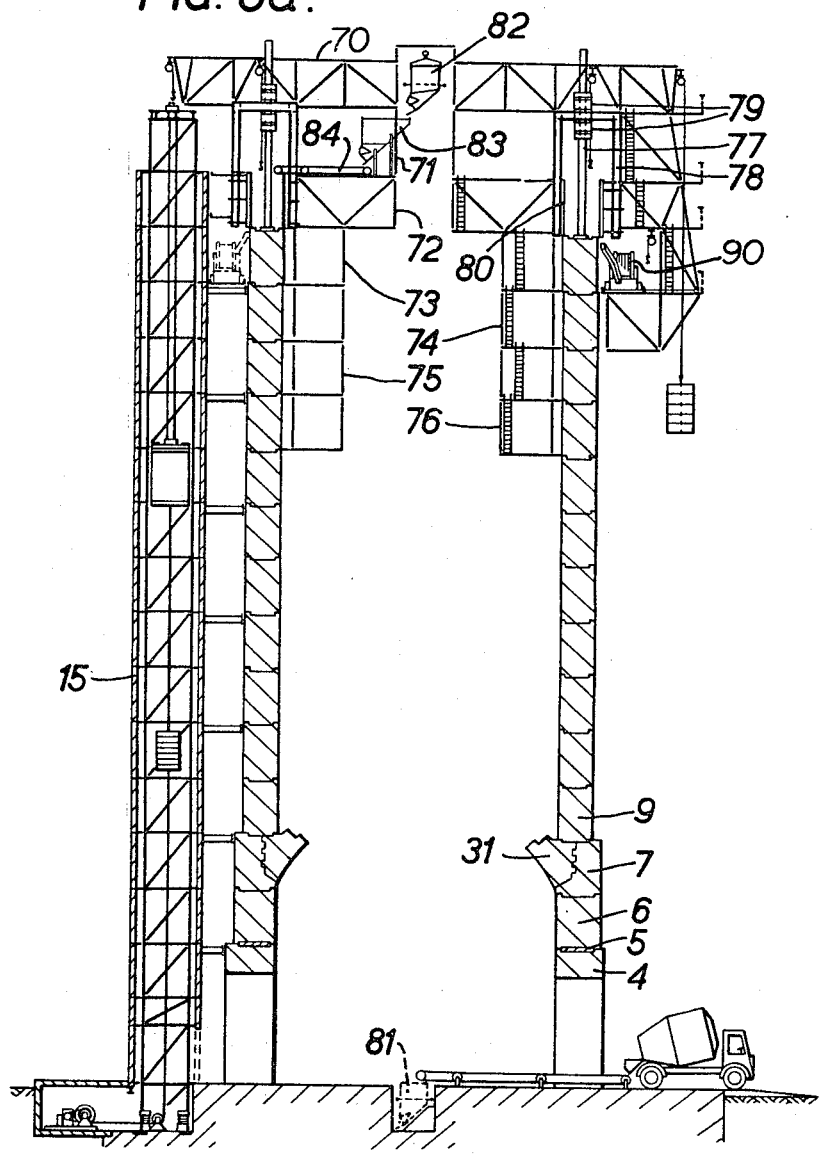
FIGURE 6a is a sectional elevation through a jig suitable for use in making a vessel according to the invention.
Figure 6C:
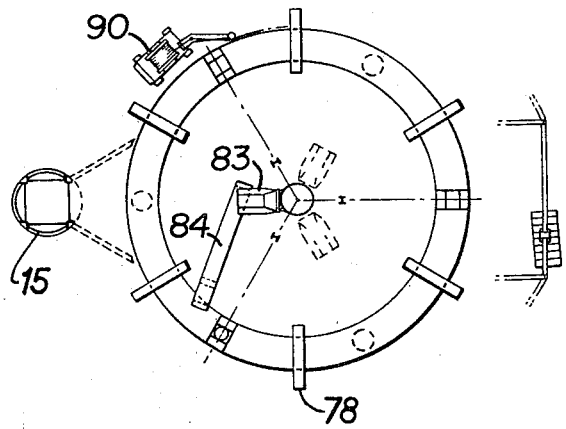
FIGURE 6c is a diagrammatic plan view showing the jig in operation.
Figure 6B:
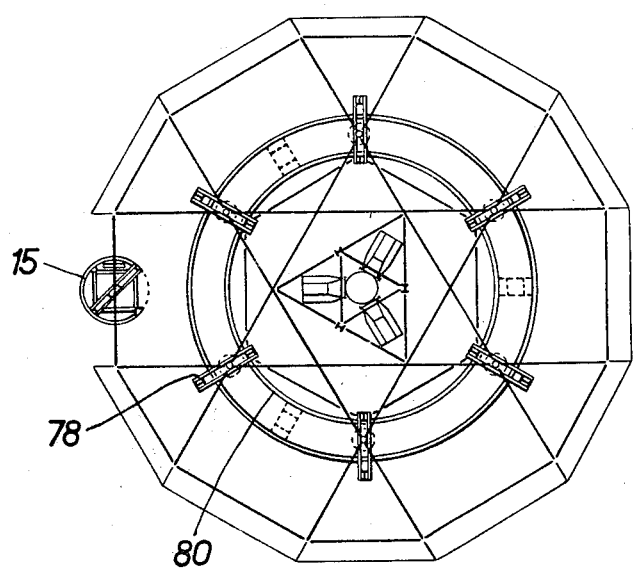

FIGURES 6a to 6c illustrates one form of jig which may be used in the construction of a pressure vessel according to the invention, and which is particularly suitable if the pressure vessel is to be relatively tall, for example, if the vessel is to be over 150 feet in height. The jig makes use of the maintenance lift for the transportation of personnel to the top of the structure where the various sections of the structure are built in situ. Thus as the pressure vessel is built the lift shaft is built at the same time so that it is of a height sufficient for the transportation of personnel to the top of the structure. For this purpose a permanent cross head P with its associated sheaves is temporarily mounted on top of the uppermost section of the lift shaft. In addition the jig is so constructed that work can be carried out simultaneously at several levels.

The jig comprises a main truss structure 70 from which depend a series of floors or working levels 71 to 76 inclusive. These several working levels enable a number of different operations to be carried out on the pressure vessel simultaneously. Thus 71 is the working level for the construction of the pressure shell and the lift shaft; 72 is the working level for the lift shaft cladding; 73 is the working level for winding the pressure "sock"; 74 is the working level for operating the separating jacks and the hoop jacks, mortar bedding, concrete packing and protection of the horizontal windings; 75 is the working level for jack removal and concrete infilling, and 76 is the working level for completing the gas-proof lining. The steel cable which forms the pressure sock is wound around the annular sections by a shuttle 90.

The main truss structure 70 is supported on a climbing shutter support 77 which co-operates with a yoke 78. Secured to the yoke 78 is shuttering 80 for the pressure shell. When one section of the pressure shell has been completed the shuttering is raised by means of lifting apparatus 79 which moves about the shutter supports 77.

Concrete for the pressure shell is preferably pumped from a lower skip 81 to an upper skip 82 from which it is transferred to a hopper 83. From the hopper 83 the concrete is fed to each segment of the annular section being constructed by means of conveyer belts 84.

In FIGURE 7 there is shown a jig which may be used if the pressure vessel to be built is relatively small, for example less than 150 feet in height. This jig uses conventional scaffolding 86 but still includes several working levels 71 to 76. In this construction the concrete is transported to the top of the structure by means of a crane 85.

It will be appreciated that if desired the pre-stressed annular members can be made separately on a site and then assembled one on top of the other to form a stack. There are however practical difficulties involve if the annular members are of large diameter, due to their weight.

I claim:
1. A method of constructing a monolithic vessel structure comprising a stack of at least two pre-stressed annular members, each of which includes at least two segments, which includes the steps of: winding a cable around the periphery of each annular member, forcing the segments in each of said annular members apart by jack means to tension said cable, securing each of said segments in their forced apart position so that each of said cables remains in said tensioned condition, capping the upper and the lowermost annular member in the stack with end members to form a closed vessel, securing a plurality of longitudinally extending pre-stressing cables to one end of the vessel, tensioning said pre-stressing cables, and thereafter securing the tensioned pre-stressing cables to the other end of the vessel, to thereby form a monolithic vessel structure.

2. A method according to claim 1, including the step of providing each segment of each of said annular members with a plurality of cells which form in the stack a plurality of axially extending cavities, the cells in each segment of the annular section being positioned along an arc which is different from that of the segment itself.

3. A method according to claim 1, including the steps of filling the vessel with a fluid under pressure and applying an outer skin of reinforced concrete to the vessel while the vessel is in the pressurised condition.

4. A method according to claim 1, including the step of moving one annular member in the stack out of contact with the adjacent annular member in the stack, prior to the step of forcing apart the segments of the one annular member.

5. A method according to claim 4, including the step of applying a lining of gas-proof material to the inner surface of said vessel prior to the step of filling said vessel with said fluid under pressure.

References Cited

UNITED STATES PATENTS

| 307,155 | 10/1884 | Williams | 52—89 |
|---|---|---|---|
| 503,575 | 8/1893 | Bratt | 138—161 |
| 862,035 | 7/1907 | Tufts | 52—247 |
| 1,146,508 | 7/1915 | Naylor | 52—249 |
| 1,189,694 | 7/1916 | Janssen | 52—224 |
| 1,344,608 | 6/1920 | Alston | 52—249 |
| 2,230,032 | 1/1941 | Freyssinet | 52—224 |
| 2,382,171 | 8/1945 | Pomykala | 52—249 |
| 2,792,794 | 5/1957 | Miller | 52—66 |
| 3,110,503 | 11/1963 | Hubbard | 52—224 |
| 3,217,451 | 11/1965 | Closner | 52—224 |
| 3,273,294 | 9/1966 | Trzesniewski | 52—248 |
| 3,304,351 | 2/1967 | Sweeney | 52—224 |

FOREIGN PATENTS

| 224,319 | 11/1962 | Austria. |
|---|---|---|
| 597,687 | 2/1948 | Great Britian. |
| 71,135 | 3/1959 | France. |

(Addition to No. 1,164,759)

FRANK L. ABBOTT, *Primary Examiner.*

J. L. RIDGILL, Jr., *Assistant Examiner.*